(12) United States Patent
Arioka

(10) Patent No.: US 7,417,846 B2
(45) Date of Patent: Aug. 26, 2008

(54) GAS-INSULATED SWITCHGEAR

(75) Inventor: Masahiro Arioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 166 days.

(21) Appl. No.: 10/509,189

(22) PCT Filed: Mar. 17, 2003

(86) PCT No.: PCT/JP03/03167

§ 371 (c)(1),
(2), (4) Date: Sep. 27, 2004

(87) PCT Pub. No.: WO2004/040729

PCT Pub. Date: May 13, 2004

(65) Prior Publication Data

US 2005/0219804 A1 Oct. 6, 2005

(30) Foreign Application Priority Data

Oct. 31, 2002 (JP) ............................. 2002-317557

(51) Int. Cl.
*H02B 13/045* (2006.01)
*H02B 13/035* (2006.01)
(52) U.S. Cl. ..................... 361/612; 361/604; 361/618; 361/619
(58) Field of Classification Search ................. 361/612, 361/618, 619, 604; 218/118, 120, 140
See application file for complete search history.

(56) References Cited

U.S. PATENT DOCUMENTS 4,744,002 A * 5/1988 Nakano et al. .............. 361/612
4,821,141 A * 4/1989 Torimi et al. ................ 361/612

(Continued)

FOREIGN PATENT DOCUMENTS

EP 924827 A1 * 6/1999

(Continued)

OTHER PUBLICATIONS

Japanese Utility Model Application No. 178111/1985 (Laid-open No. 88408/1987 (Meidensha Corp.), abstract.

(Continued)

*Primary Examiner*—Anatoly Vortman
(74) *Attorney, Agent, or Firm*—Sughrue Mion, PLLC

(57) ABSTRACT

For simple structure and easy manufacture, module tanks have a common standardized size so that the same tank is applicable even when the components to be accommodated are changed. The basic structure of the module is arranged so that all of the interrupter, the disconnector with the grounding switch, the bus bar bushing, the cable connecting bushing and the gas section spacer can be mounted, and necessary main circuit components depending upon the circuit to be used are left behind and unnecessary main circuit components are short-circuited by a short-circuiting conductor, and that the tank opening portions are either left un-worked during manufacture or closed by a cover. The bus bar bushings and the cable connecting bushings are attached at the rear face of the tank and the gas section spacer is disposed on the top or bottom face of the tank. A lightning arrester in lieu of interrupter may be accommodated within an insulating cylinder housing the main circuit of the interrupter.

9 Claims, 6 Drawing Sheets

U.S. PATENT DOCUMENTS

| | | | | | |
|---|---|---|---|---|---|
| 4,837,662 | A | * | 6/1989 | Takeuchi et al. | 361/618 |
| 4,967,307 | A | * | 10/1990 | Itou et al. | 361/618 |
| 5,898,565 | A | * | 4/1999 | Yamauchi et al. | 361/612 |
| 6,219,225 | B1 | * | 4/2001 | Tsuzura et al. | 361/612 |
| 6,515,247 | B1 | * | 2/2003 | Tsuzura et al. | 218/43 |

FOREIGN PATENT DOCUMENTS

| | | | |
|---|---|---|---|
| JP | 4-112604 A | | 4/1992 |
| JP | 5-304704 A | | 11/1993 |
| JP | 06-311614 A | | 11/1994 |
| JP | 7-123541 A | | 5/1995 |
| JP | 8-340610 A | | 12/1996 |
| JP | 08335430 A | * | 12/1996 |
| JP | 11-185577 A | | 7/1999 |
| JP | 2000228806 A | * | 8/2000 |
| JP | 2001-352623 A | | 12/2001 |

OTHER PUBLICATIONS

Japanese Utility Model Application No. 11622/1993 (Laid-open No. 74012/1994) (Meidensha Corp.), abstract.

* cited by examiner

GAS-INSULATED SWITCHGEAR

TECHNICAL FIELD

This invention relates to a gas-insulated switchgear.

BACKGROUND ART

A conventional gas-insulated switchgear, as described in Japanese Patent Laid-Open No. 2001-311614, for example, has a first module mounted on a mount bed and a second module mounted on the first module via a gas section spacer. Within a tank of the first module, interrupters and grounding switches are accommodated and bushings for connecting cables are attached to the bottom face of the tank. A tank of the second module is smaller than the tank of the first module and has disconnectors with grounding switches accommodated therein and bus bar bushings to which bus bars are connected are attached on upper portion of the second module tank. Also, the first module and the second module are connected via a gas section spacer that can maintain hermetic seal of the respective tanks. On the tank front side of each of the first module and the second module, an opening portion is disposed, to which respective mounting plates are hermetically attached. The mounting plates has attached to their front face the interrupters, the disconnectors with grounding switches and operating units for the grounding switches.

In the conventional switchgear, the first and the second modules are different in tank size from each other, so that panel configurations at the tank rear side must be hook-shaped, making the structure complex and the manufacture difficult.

Also, since the tanks of the first and the second modules are different according to the equipments to be accommodated, the outer diameter dimension and structure of the tanks had to be changed according to the equipments to be housed, requiring a long period of time for planning of the tank manufacture.

Accordingly, the object of the present invention is to provide a gas-insulated switchgear using a module that is equal to other module in the tank size and configuration and that can cope with electrical devices of several kinds to be housed within the module.

DISCLOSURE OF INVENTION

In order to solve the above-discussed problems, according to the present invention, the gas-insulated switchgear, in which a main circuit components are accommodated within a tank hermetically filled with an electrically insulating gas, comprises at least one switchgear module in which a disconnector with a grounding switch and an electrically insulating frame for selectively supporting an interrupter including a vacuum switch tube are disposed in the tank in a vertically stacked relationship, and in which the disconnector and the vacuum switch tube are connected, specifically, the disconnector and a movable rod of said vacuum switch tube are electrically connected to each other.

That is, the basic structure of the module is arranged so that all of the interrupter, the disconnector with the grounding switch, the bus bar bushing, the cable connecting bushing and the gas section spacer can be mounted, and necessary main circuit components depending upon the circuit to be used are left behind and unnecessary main circuit components are short-circuited by a short-circuiting conductor, and that the tank opening portions are either left un-worked during manufacture or closed by a cover.

BEST MODE FOR CARRYING OUT THE INVENTION

Embodiment 1

Figure 1:
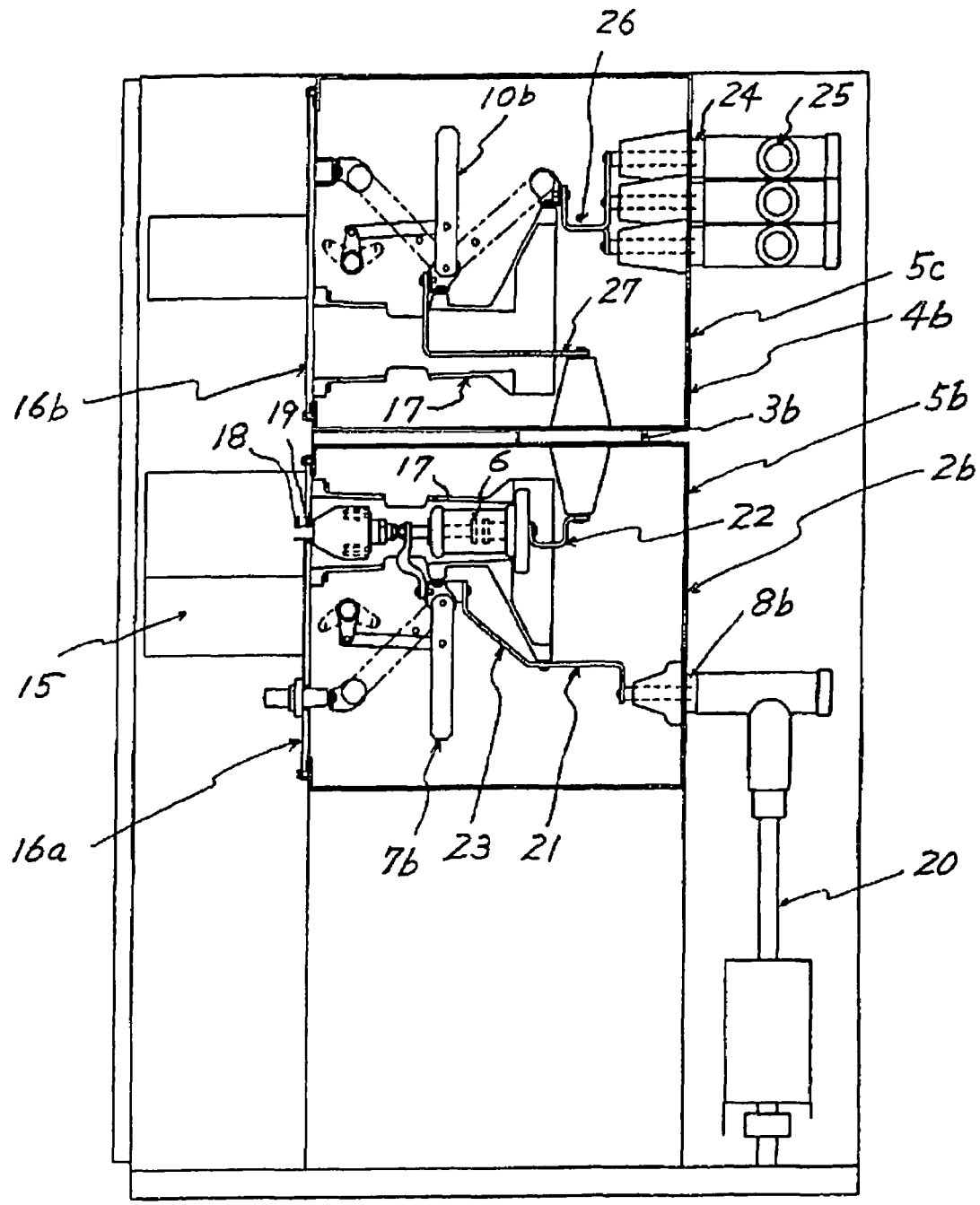
FIG. 1 is a sectional side view of the first embodiment of the gas-insulated switchgear of the present invention.
Figure 2:
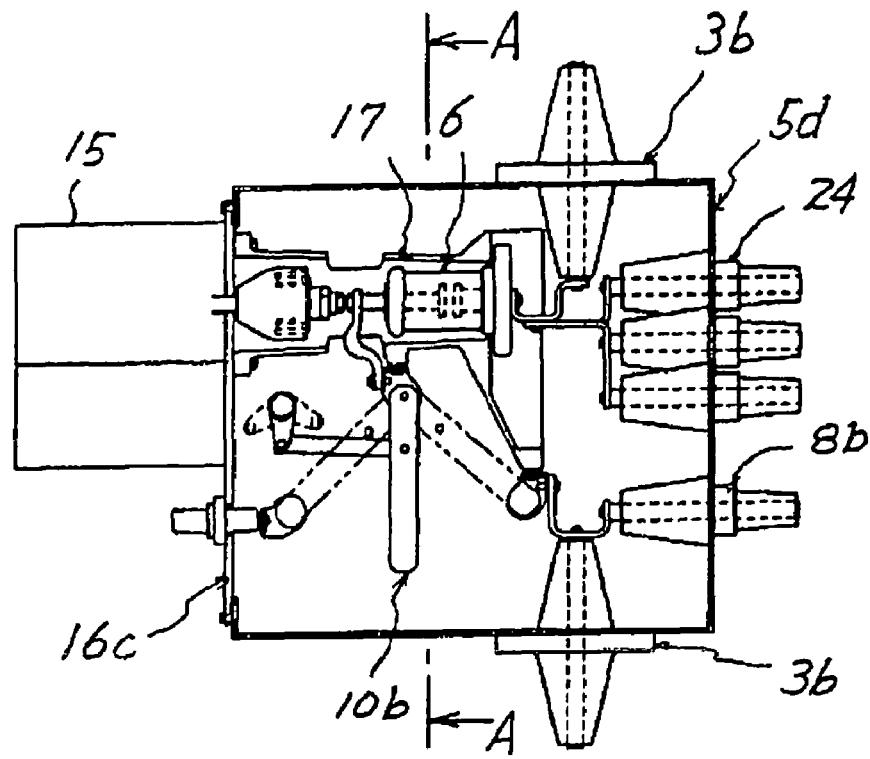
FIG. 2 is a sectional side view showing the basic configuration of the module of the present invention.

As illustrated in FIG. 1, the gas-insulated switchgear comprises a first module 2b and a second module 4b, the respective tanks 5b and 5c thereof having identical outer diameter dimension and configuration. In the illustrated example, each of the tanks 5b and 5c are of a substantially square configuration having substantially equal depth, width and height dimensions, but may equally be of a rectangular prallelopiped configuration.

The first module tank 5b has at its front face an opening portion to which a mounting plate 16a is hermetically attached. Attached to the rear face of the mounting plate 16a are an electrically insulating cylinders 17 in which interrupters 6 are accommodated and grounding switches 7b, and operating rods 18 for driving the interrupters 6 and the grounding switches 7b extending through a hole formed in the mounting plate 16a are connected to operating units 15 attached to the front face of the mounting plate 16a. Packings 19 maintains the hermetic seal between the operating rods 18 and the mounting plate 16a even when the operating rods are actuated. Cable connecting bushings 8b are mounted to the tank rear face for the connection of power cables 20 and a gas section spacer 3b is hermetically attached to the tank top face. The main circuit components are connected by connecting conductors 21 and 22, and the disconnector portion that is removed from the basic structure is also connected by short-circuiting conductors 23. The opening portions for the bus bars that are removed from the basic structure are used during assembly within the tank and closed by covers after the completion of the assembly.

The second module tank 5c has, similarly to the first module tank 5b, at its front face an opening portion to which a mounting plate 16b is hermetically attached. Attached to the rear face of the mounting plate 16b are an electrically insulating cylinder 17 in which an interrupter is accommodated and a disconnector 10b with a grounding switch. A bus bar bushings 24 are mounted to the tank rear face for the connection of bus bars 25 and a gas section spacer 3b is hermetically attached to the tank bottom face. The main circuit components are connected by connecting conductors 26, and the interrupter portion that is removed from the basic structure is also connected by short-circuiting conductors 27. The opening portions for the cable connecting bushings that are removed from the basic structure are used during assembly within the tank and closed by a cover after the completion of the assembly (not shown).

Figure 3:
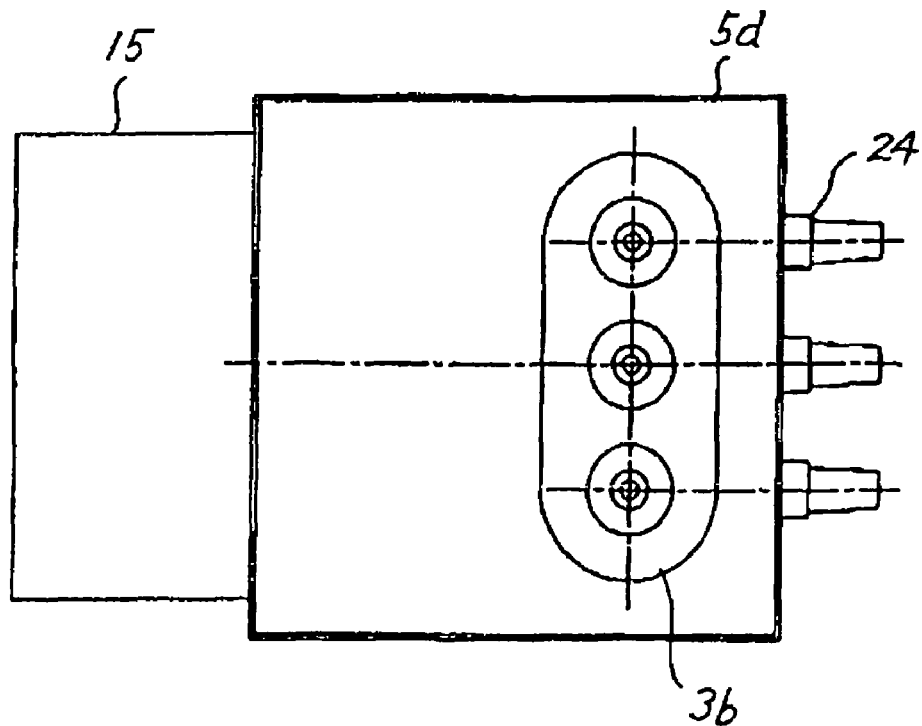
FIG. 3 is a plan view of the module shown in FIG. 2.
Figure 4:
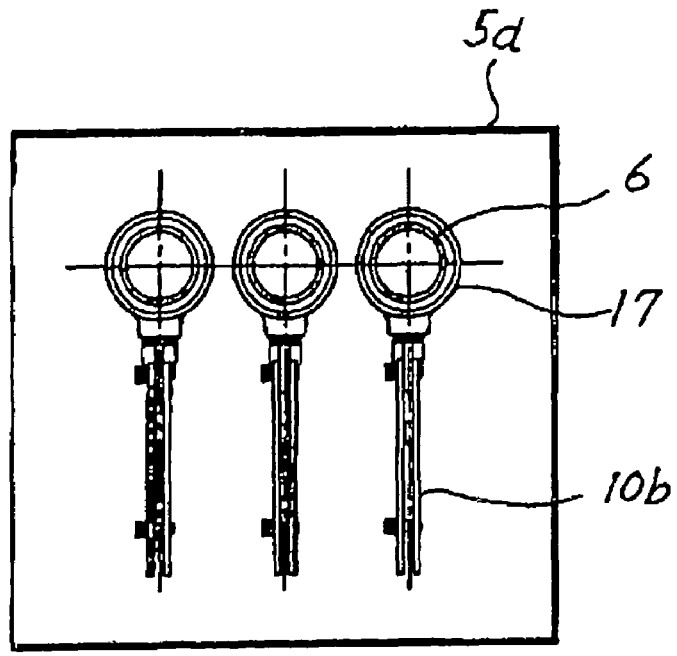
FIG. 4 is a sectional view of the module taken along line A-A of FIG. 2.
Figure 5:
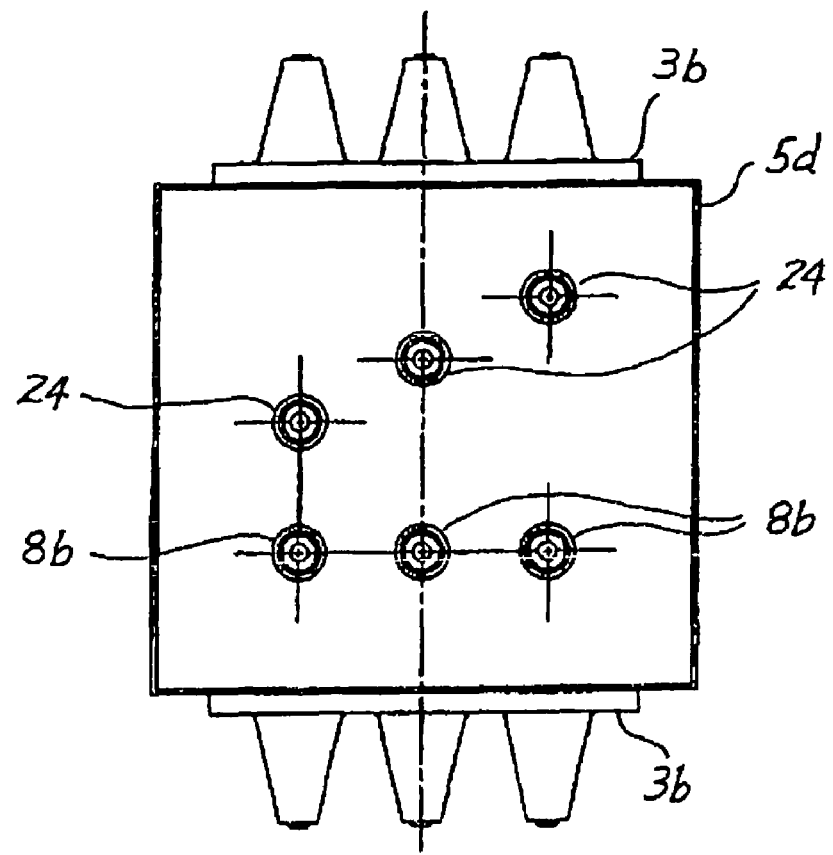
FIG. 5 is a rear view of the module shown in FIG. 2.
Figure 6:
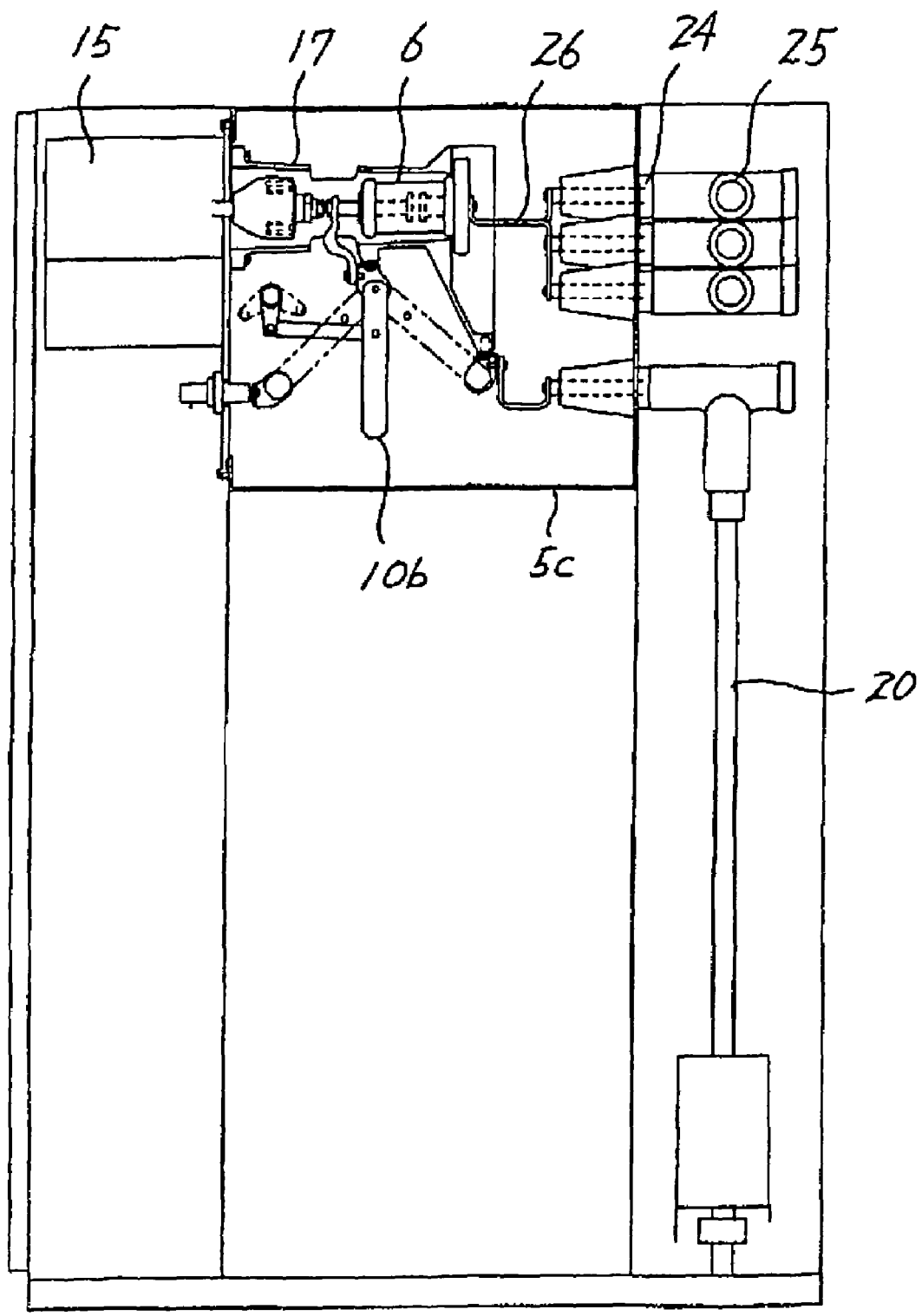
FIG. 6 is a sectional side view showing the gas-insulated switchgear using only one basic configuration of the module shown in FIG. 2.

FIGS. 2 to 5 illustrate the basic structure of the module for a gas-insulated switchgear. As shown in these figures, an opening portion is provided at the front face of the module tank 5d, and the opening portion has hermetically attached thereto a mounting plate 16c. Attached to the mounting plate 16c is an insulating cylinder 17 below which the disconnector 10b with a grounding switch is disposed, and at the tank rear face the bus bar bushings 24 are disposed in a positional relationship in which the first and the third phases are vertically and horizontally displaced relative to the second phase. Bellow the bus bar bushings 24, the cable connecting bushings 8b are horizontally disposed. On the other hand, on the top and the bottom face of the tank, the gas section spacers 3b are mounted. In the actual circuit configuration, there is no such a case in which all of the bus bar bushings 24, the cable connecting bushings 8b and upper and lower gas section spacers 3b are necessary, and unnecessary equipments are removed and in the actual application the mounting openings for the removed equipments are utilized as the opening portions for the tank inside works and a cover plate can be hermetically attached after the work. Also, the switchgear module may equally be used by positioning upside down, with the disconnectors 10b with the grounding switches disposed above the insulating cylinders and the cable connecting bushings 8b disposed above the bus bar bushings 24 in inverted positions. Also, as illustrated in FIG. 3, this basic configuration may also used in the case where a single switchgear module is used when the gas section spacer 3b is removed and the opening portions are closed by the a closure member (not shown).

Embodiment 2

Figure 7:
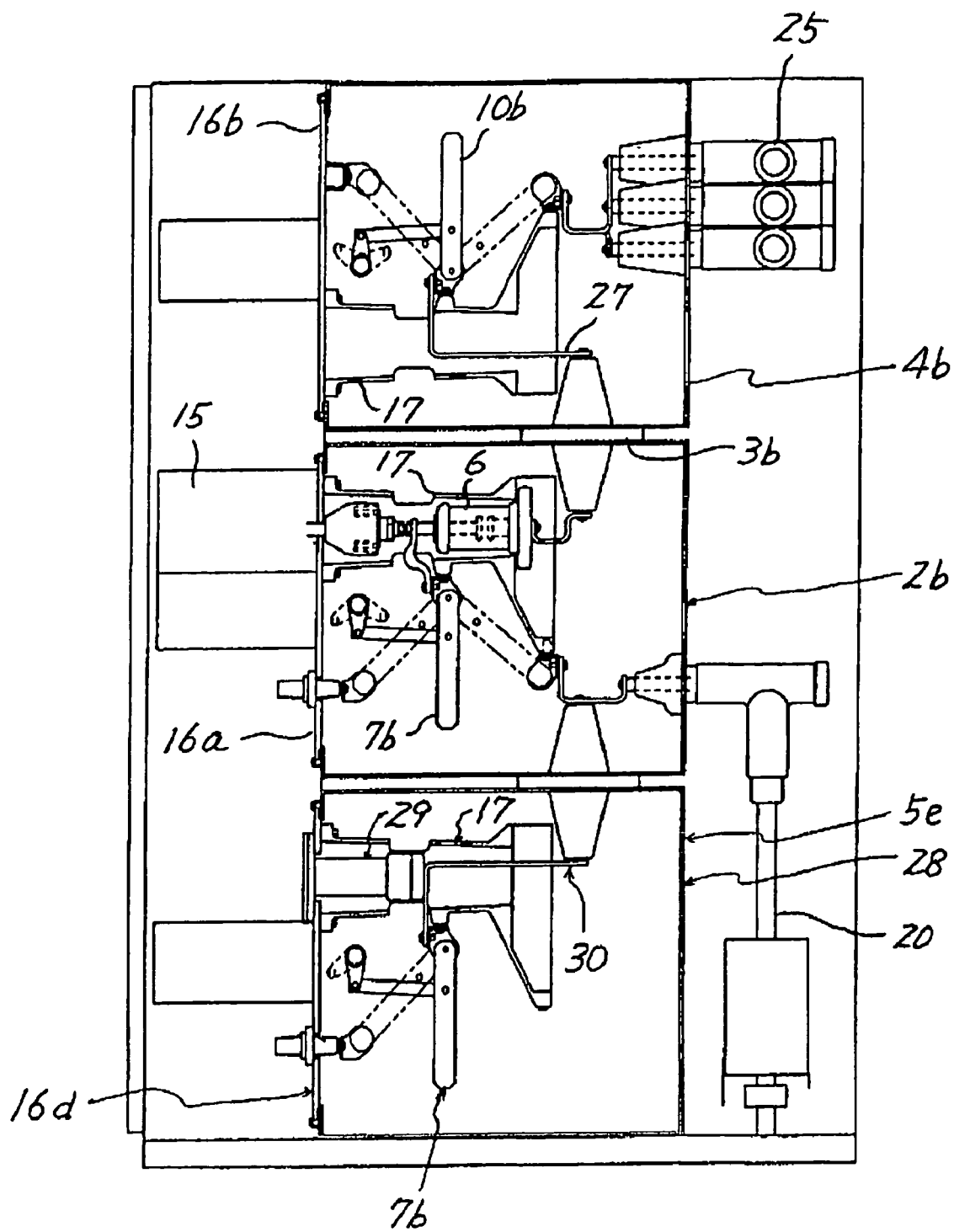
FIG. 7 is a sectional side view showing the second embodiment of the present invention.

As shown in FIG. 7, similarly to the first embodiment, the first module 2b and the second module 4b (the equipments within the tank is changed to a disconnector with a grounding switch instead of a grounding switch) are provided and a third module 28 is mounted under the first module 2b via the gas section spacer 3b. The third module tank 28 similar to other tanks has at the front face of the tank an opening portion, to which a mounting plate 16d is hermetically attached. At the rear face of the mounting plate 16d, insulating cylinders 17 and grounding switches 7b disposed under the insulating cylinders 17 are mounted. The gas section spacers 3b are electrically connected to lightning arresters 29 and the grounding switches 7b by connecting conductors 30.

Embodiment 3

Figure 8:
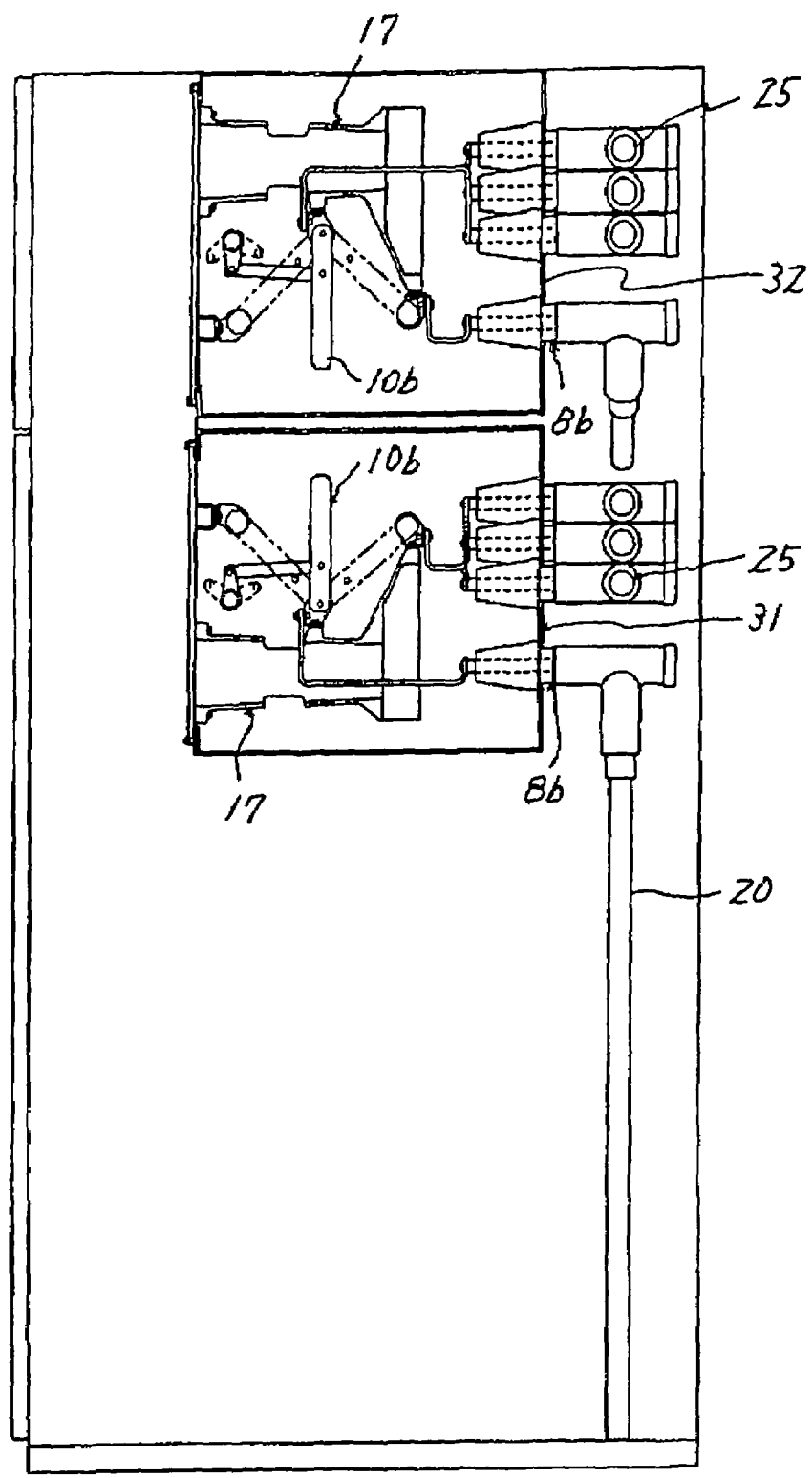
FIG. 8 is a sectional side view showing the third embodiment of the present invention.

As illustrated in FIG. 8, two gas-insulated switchgear modules are used and the positions of the bus bars 25 of a fourth module 31 are at the same height as those of the first embodiment illustrated in FIG. 1 and can be connected to them. Each of the fourth module 31 and a fifth module 32 is provided above or below the insulating cylinder 17 with a disconnector 10b with a grounding switch, and the power cable bushings 8b and the bus bars 25 for connecting to the respective individual circuits are attached to the rear face of the tank. Also, there is no gas section spacer is interposed between the fourth module 31 and the fifth module 32 and the mounting hole for the gas section spacer is closed.

According to the gas-insulated switchgear of the present invention, by removing unnecessary equipments from the basic module and by connecting the modules in which the removed equipments are connected by short-circuiting conductors and the modules in which the opening portions are closed are connected with a gas section spacer, a necessary circuit configuration can be obtained, so that it can be easily adapted to any circuit configuration, making the circuit planning easy and realizing the standardization of the module.

INDUSTRIAL APPLICABILITY

As has been apparent from the foregoing description, according to the present invention, the gas-insulated switchgear in which main circuit components are accommodated within a tank hermetically filled with an electrically insulating gas comprises at least one switchgear module in which a disconnector with a grounding switch and an electrically insulating frame for selectively supporting an interrupter including a vacuum switch tube are disposed in the tank in a vertically stacked relationship, and in which said disconnector and said vacuum switch tube are connected, specifically, the disconnector and a movable rod of said vacuum switch tube are electrically connected to each other. Therefore, a gas-insulated switchgear can be obtained in which the module tanks are the same to each other in dimensions and configuration, and that can be adapted to various electric equipments to be accommodated within the module.

The invention claimed is:

1. A gas-insulated switchgear in which main circuit equipments are accommodated within a tank hermetically filled with an electrically insulating gas, comprising;
    at least one switchgear module in which a disconnector with a grounding switch and an electrically insulating frame for selectively supporting an interrupter including a vacuum switch tube are disposed in the tank in a vertically stacked relationship, and in which said disconnector and a movable rod of said vacuum switch tube are electrically connected to each other,
    wherein said tank is provided, at a front face thereof, with an opening portion that is hermetically closed by a mounting plate for selectively mounting thereon the interrupter and the disconnector with the grounding switch and, at the rear face thereof, with an opening portion for selectively mounting therein a bus bar bushing or a cable connecting bushing, and, at the upper or the lower portions thereof, with at least one opening for selectively mounting thereto a spacer for hermetically connecting the tanks.

2. A gas-insulated switchgear in which main circuit equipments are accommodated within a tank hermetically filled with an electrically insulating gas, comprising;
    at least one switchgear module in which a disconnector with a grounding switch and an electrically insulating frame for selectively supporting an interrupter including a vacuum switch tube are disposed in the tank in a vertically stacked relationship, and in which said disconnector and a movable rod of said vacuum switch tube are connected to each other, wherein in said switchgear module, said tank is provided, at a front face thereof, with an opening portion that is hermetically closed by a mounting plate for selectively mounting thereon the interrupter and the disconnector with the grounding switch and, at a rear face thereof, with an opening portion for selectively mounting therein a bus bar bushing or a cable connecting bushing, and, at the upper or the lower portions thereof, with at least one opening for selectively mounting thereto a spacer for hermetically connecting the tanks.

3. A gas-insulated switchgear in which main circuit equipments are accommodated within a tank hermetically filled with an electrically insulating gas, comprising;

at least one switchgear module in which a disconnector with a grounding switch and an electrically insulating frame for selectively supporting an interrupter including a vacuum switch tube are disposed in the tank in a vertically stacked relationship, and in which said disconnector and a movable rod of said vacuum switch tube are electrically connected to each other, wherein a plurality of said switchgear modules are connected to each other via a spacer hermetically connecting said tank to define a circuit, wherein said tank is provided, at a front face thereof, with an opening portion that is hermetically closed by a mounting plate for selectively mounting thereon the interrupter and the disconnector with the grounding switch and, at a rear face thereof, with an opening portion for selectively mounting therein a bus bar bushing or a cable connecting bushing, and, at an upper or a lower portion thereof, with at least one openings for selectively mounting thereto a spacer for hermetically connecting the tanks.

4. A gas-insulated switchgear in which main circuit equipments are accommodated within a tank hermetically filled with an electrically insulating gas, comprising;

at least one switchgear module in which a disconnector with a grounding switch and an electrically insulating frame for selectively supporting an interrupter including a vacuum switch tube are disposed in the tank in a vertically stacked relationship, and in which said disconnector and a movable rod of said vacuum switch tube are electrically connected to each other, wherein in said switchgear module, at least one of the interrupter, the disconnector with the grounding switch, a bus bar bushing and the cable connecting bushing is mounted, wherein a plurality of said switchgear modules are connected to each other via a spacer hermetically connecting said tank to define a circuit, wherein said tank is provided, at a front face thereof, with an opening portion that is hermetically closed by a mounting plate for selectively mounting thereon the interrupter and the disconnector with the grounding switch and, at a rear face thereof, with an opening portion for selectively mounting therein a bus bar bushing or a cable connecting bushing, and, at upper or lower portions thereof, with at least one opening for selectively mounting thereto a spacer for hermetically connecting the tanks.

5. A gas-insulated switchgear as claimed in claim 1, wherein, within said switchgear module, said insulating frame has a lightning arrester accommodated therein, and wherein a module in which a grounding switch or a disconnector with a grounding switch is accommodated is disposed above or below the insulating frame.

6. A gas-insulated switchgear as claimed in claim 2, wherein, within said switchgear module, said insulating frame has a lightning arrester accommodated therein, and wherein a module in which a grounding switch or a disconnector with a grounding switch is accommodated is disposed above or below the insulating frame.

7. A gas-insulated switchgear as claimed in claim 3, wherein, within said switchgear module, said insulating frame has a lightning arrester accommodated therein, and wherein a module in which a grounding switch or a disconnector with a grounding switch is accommodated is disposed above or below the insulating frame.

8. A gas-insulated switchgear as claimed in claim 4, wherein, within said switchgear module, said insulating frame has a lightning arrester accommodated therein, and wherein a module in which a grounding switch or a disconnector with a grounding switch is accommodated is disposed above or below the insulating frame.

9. A gas-insulated switchgear in which main circuit equipments are accommodated within a tank hermetically filled with an electrically insulating gas, comprising;

at least one switchgear module in which a disconnector with a grounding switch and an electrically insulating frame for selectively supporting an interrupter including a vacuum switch tube are disposed in the tank in a vertically stacked relationship;

in which a movable element of said disconnector is rotatably supported at one distal end solely by said insulating frame; and in which said disconnector and a movable rod of said vacuum switch tube are electrically connected to each other, wherein said tank is provided, at a front face thereof, with an opening portion that is hermetically closed by a mounting plate for selectively mounting thereon the interrupter and the disconnector with the grounding switch and, at the rear face thereof, with an opening portion for selectively mounting therein a bar bushing or a cable connecting bushing, and, at the upper or the lower portions thereof, with an opening for selectively mounting thereto a spacer for hermetically connecting the tanks, and wherein, the tank is made applicable in either modules by, during tank manufacture, eliminating forming of the selected opening or by closing the selected opening with a cover plate.

* * * * *